Figure 1:
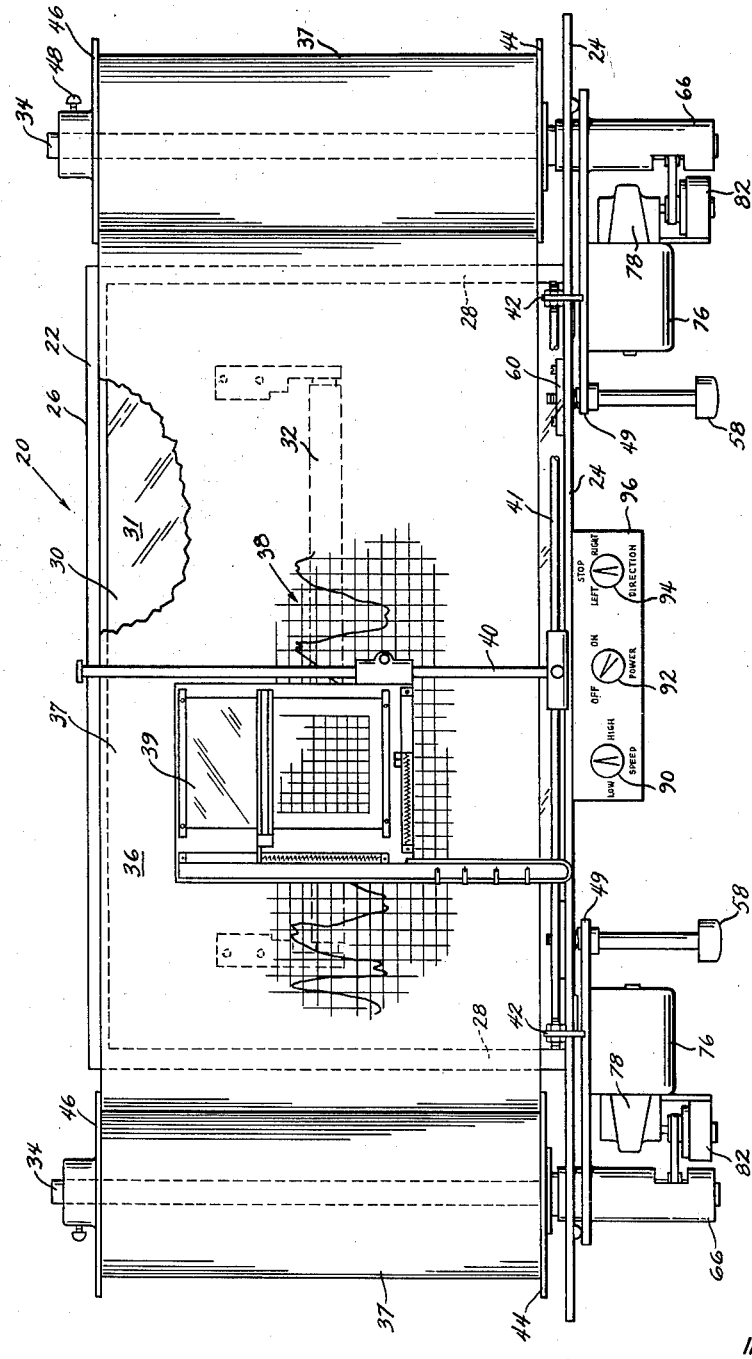

Sept. 3, 1963     H. J. GERBER     3,102,701
CHART POSITIONING MECHANISM FOR DATA READING APPARATUS
Filed July 1, 1960     3 Sheets-Sheet 1

INVENTOR
HEINZ JOSEPH GERBER
BY Teller & McCormick
ATTORNEYS

Sept. 3, 1963

H. J. GERBER 3,102,701

CHART POSITIONING MECHANISM FOR DATA READING APPARATUS

Filed July 1, 1960

3 Sheets-Sheet 3

United States Patent Office 3,102,701
Patented Sept. 3, 1963

3,102,701
CHART POSITIONING MECHANISM FOR DATA READING APPARATUS
Heinz Joseph Gerber, Hartford, Conn., assignor to The Gerber Scientific Instrument Company, South Windsor, Conn., a corporation of Connecticut
Filed July 1, 1960, Ser. No. 40,323
7 Claims. (Cl. 242—67.3)

This invention relates to chart positioning apparatus, and deals more particularly with an apparatus for use with an elongated chart sheet or strip, such as an oscillogram or oscillogram sheet, the apparatus including an exposed face for supporting a longitudinal portion of such a chart sheet and including spindles which serve to receive in wound fashion the end portions of the strip located on either side of the exposed face.

In chart positioning mechanism of the type with which this invention is concerned, the oscillogram sheet or other elongated chart having data recorded thereon is moved across the exposed face of the apparatus by rotating one or the other of the two spindles in the winding direction. The chart is thus wound onto one spindle and unwound from the other spindle, and the portion of the chart extended between the two spindles is moved over the exposed surface which supports the same for display purposes. Generally the winding and unwinding of the chart is performed in such a manner as to successively display successive longitudinal portions of the chart, and the movement of the chart is stopped as each successive portion comes into view to permit measurements or readings of the data recorded thereon to be taken. The apparatus also may have associated therewith one or more instrumentalities facilitating the measuring or reading of the recorded data, but such instrumentalities do not of themselves form any part of the present invention.

For illustrations of instrumentalities which might be employed with apparatus embodying the present invention for the purpose of facilitating the measurement of the recorded data, reference is made to the copending Gerber application Serial No. 769,176 filed October 23, 1958, and entitled "Data Reading Apparatus," and to the copending Gerber application Serial No. 816,299 filed May 27, 1959, and entitled "Reading Head for Data Reading Apparatus." The disclosures of such instrumentalities in said applications are incorporated herein by reference. The structure shown by these two copending applications for supporting and winding and unwinding an elongated chart sheet is of the general type to which this invention relates, but has a shape and arrangement of parts which is different from that of the structure shown and described herein.

The general object of this invention is to provide a chart positioning apparatus having two transverse spindles adapted respectively for receiving in wound fashion the opposite end portions of an elongated chart sheet and an exposed surface for supporting and displaying a portion of the chart sheet extended between the two spindles, and wherein the sprindles are mounted in an improved manner which permits the adjustment of their axes so that the chart in traveling between the two spindles may be made to move in a straight longitudinal path without any tendency to wander or run out in either direction axially of the spindles, thereby preventing damage to the edges of the chart by forceful contact with the flanges of the spindles, or, if the spindles each have only one or no flanges, preventing the chart from moving laterally of the exposed face.

A more particular object of this invention is to provide a chart positioning mechanism of the above-defined character having means for supporting the spindles and their drive mechanisms for adjustable angular movement relative to the exposed chart supporting surface so that the positions of the spindle axes may be shifted to correct for parallel misalignment of the spindles which misalignment is generally inherent in most prior apparatus of a similar character, or to suit the spindle positions to charts having irregularities therein due to warping and the like, so that the chart sheet will track properly between the two spindles without rubbing against the spindle flanges, or without moving laterally of the exposed face if the spindles each have only one or no flanges.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 2:
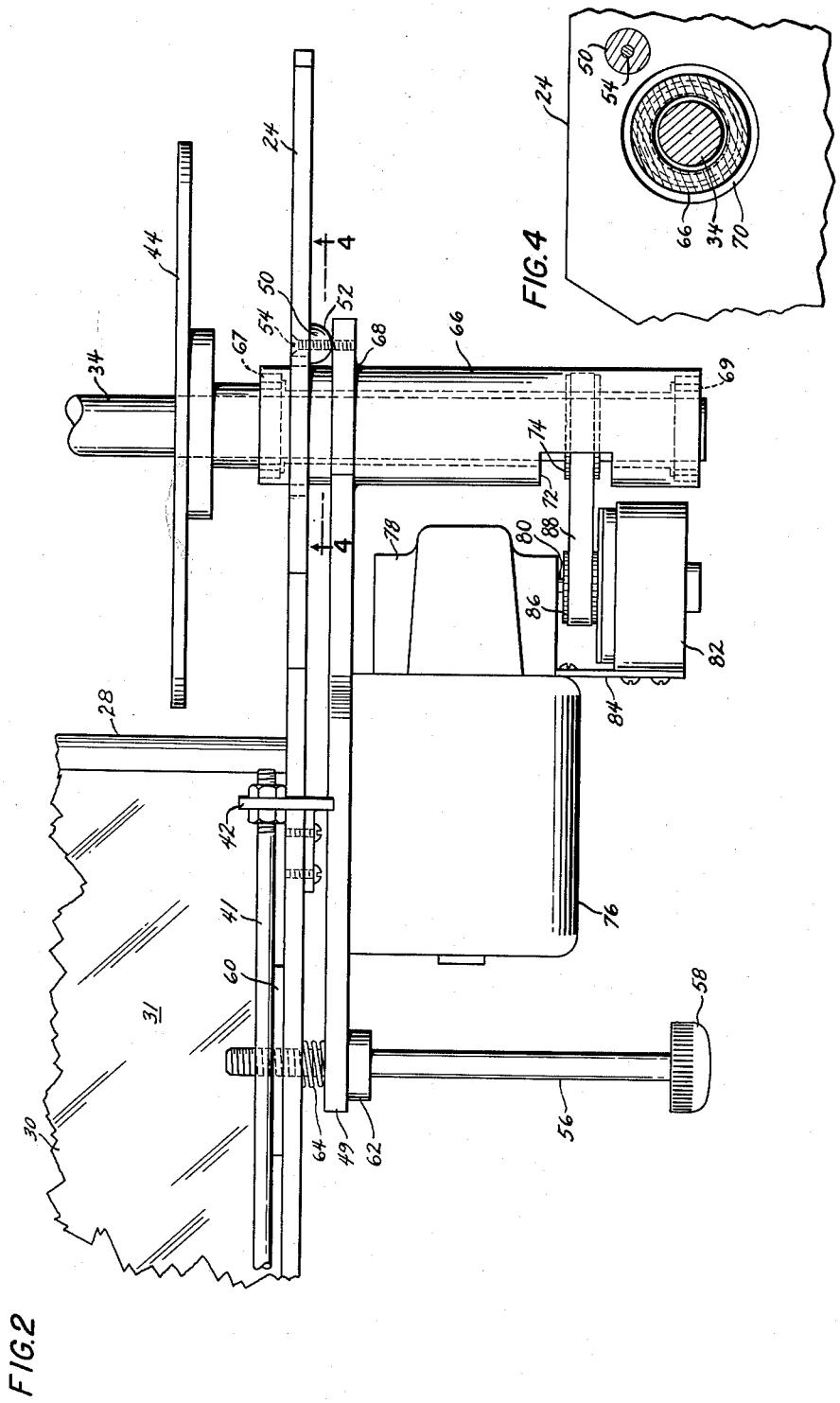
Figure 3:
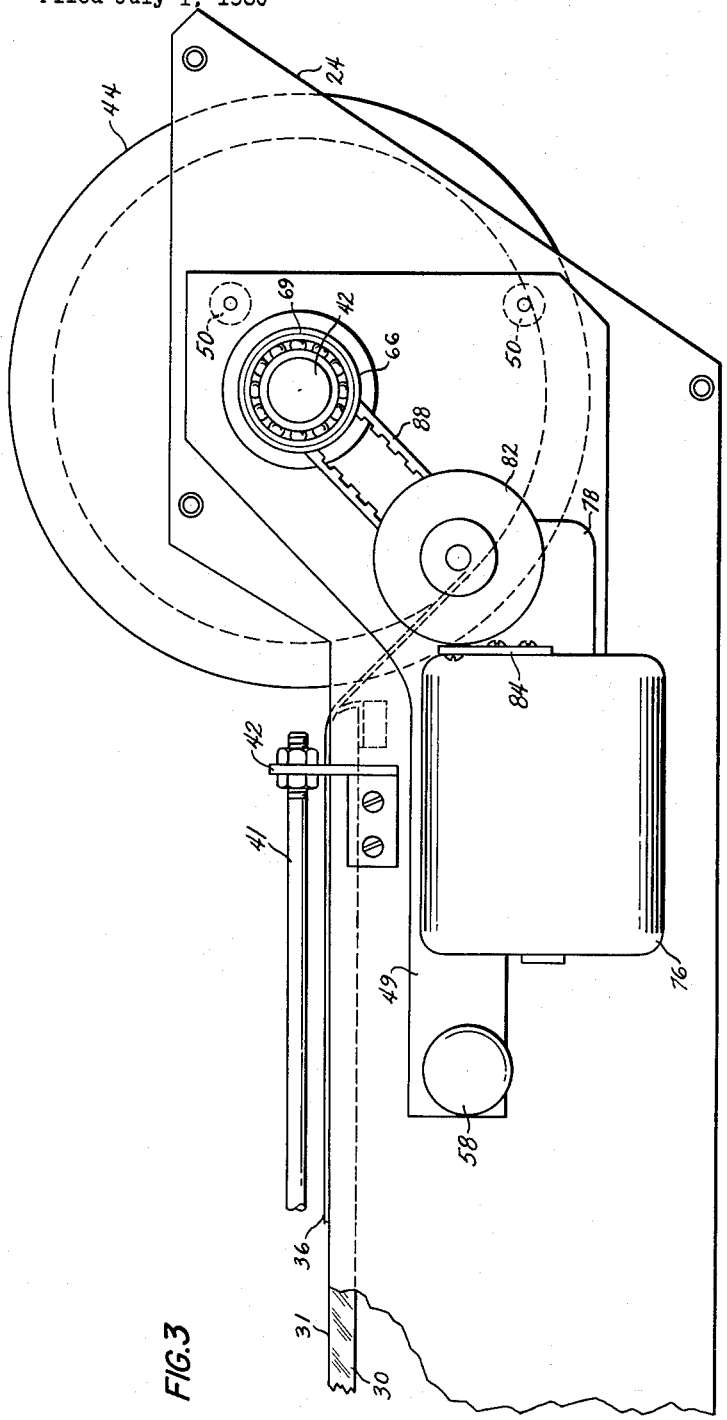

Of the drawings:
FIG. 1 is a plan view of a chart positioning apparatus embodying this invention.
FIG. 2 is an enlarged plan view of the spindle support means and drive mechanism associated with the spindle shown at the right in FIG. 1, but with the wound portion of the chart sheet being removed from the spindle.
FIG. 3 is a front view of the support means and drive mechanism shown in FIG. 2.
FIG. 4 is a fragmentary vertical sectional view taken on the line 4—4 of FIG. 3.

Referring first to FIG. 1, the reference numeral 20 indicates generally a chart positioning apparatus embodying this invention. The apparatus 20 includes a main body 22 having a front side wall 24, a rear side wall 26 and two end walls 28, 28. Supported adjacent the top edges of the four walls is a generally rectangular plate 30 having a substantially flat upwardly exposed face 31. The plate 30 is preferably made of a transparent or translucent material, such as frosted glass, and the body 22 preferably contains a light source, such as a fluorescent lighting tube 32, which is located below the plate 30 and mounted on the bottom of the body.

Located respectively on either side of the main body 22 are two spindles 34, 34 which are mounted for rotation about transverse axes extending generally parallel to the end walls 28, 28, and are adapted to respectively receive in wound fashion the opposite end portions of an elongated chart sheet 36. The two wound portions of the chart sheet 36 are indicated at 37, 37. These two wound portions may either be carried directly by the respective spindles, in which case the ends of the chart are fastened to the spindle by suitable means such as masking tape, or may be carried by separate spools or core members which are adapted to be fitted over the spindles, the spools or core members and the spindles having cooperating means for preventing the spool or core from rotating on its spindle. The spindles 34, 34 are so located that the chart sheet 36 will have a portion 37 thereof extended between the two spindles and passing over the upwardly exposed face 31. The exposed face 31 serves to support the chart portion 37 so that readings or measurements of data recorded thereon may be taken, and the light from the fluorescent tube 32 helps to illuminate the chart for this purpose. In FIG. 1, the reference numeral 38 indicates an area of the chart sheet having data in the form of a curve or trace recorded thereon, and which curve or trace is to be measured. In an oscillogram sheet there may be several such curves or traces running longitudinally the entire length of the sheet with each curve comprising what is generally referred to as a "channel." As suggested previously, the mechanism 20 may have an instrumentality associated therewith for facilitating the reading or measurement of the data recorded on the chart sheet 36. In FIG. 1 such an instrumentality is shown to comprise a reading head 39 substantially similar to the reading head disclosed and claimed in my above-mentioned copending application Serial No. 769,176, to which application reference is made for the details of its construction. As shown in FIG. 1, the head 39 is supported for transverse movement by a rod 40, and for longitudinal movement by a rod 41 to which the rod 40 is slidably connected. The rod 41 is supported at both of its ends by brackets 42, 42 connected to the front wall 24.

It is to be understood that the shape of the main body, and the arrangement of the spindles 34, 34 with respect thereto, as shown in FIG. 1, may be varied without departing from at least the broader aspects of this invention, as long as the body provides an exposed viewing surface or face and the spindles cooperate to pass a portion of the chart over the face as the chart is wound and unwound, respectively, relative to the spindles. For example, the two copending applications referred to above show a different body construction and spindle arrangement in a data reader to which this invention may be applied.

As shown in FIG. 1, each of the spindles 34, 34 includes a front flange 44 and a rear flange 46. The front and rear flanges 44 and 46 extend radially outwardly from the spindle 34 on opposite sides of that portion of the spindle on which the chart is wound and serve to hold the wound portion 37 of the chart on the spindle by engagement with the adjacent edges thereof. The bottom flange 44 is preferably permanently fixed to the spindle 34, and the upper flange 46 removably fixed to the spindle by a thumb screw 48, and adjustable to various positions along the length of the spindle, to permit the installation and removal of different charts to and from the apparatus, and two permit its use with charts of different widths. The two flanges of each spindle are not entirely necessary however, and one or both of them may be omitted if desired.

According to the invention, each of the two spindles 34, 34 is so mounted to the body 22 that its axis may be angularly shifted to bring the two spindles into such a relationship that the chart sheet 36, in traveling between the two spindles, will follow a straight longitudinal path across the exposed face 31 without rubbing against the spindle flanges 44, 44 or 46, 46, or without moving laterally of the exposed face if the spindles individually include only one or no flange. This mounting of the spindles is such that the spindles are supported in cantilevered fashion from one side of the body so that the ends of the spindles at the other side of the body are free and unsupported. In conjunction with this cantilevered mounting of the spindles there is also provided means for adjusting the angular position of each spindle so as to move its free end toward or away from the free end of the other spindle. FIGS. 2 and 3 show the spindle mounting and adjustment means associated with the right-hand spindle of FIG. 1. This means is similar to that employed in connection with the left-hand spindle, and therefore the following description which deals particularly with the right-hand spindle should be taken to apply as well to the left-hand spindle. Referring to FIGS. 2 and 3, the illustrated spindle mounting and adjustment means includes a mounting or support plate 49 which is disposed in generally parallel spaced relationship with the front wall 24 of the body 22 at the right-hand corner thereof, the front wall 24 being extended some distance beyond the adjacent side wall 28 to accommodate the mounting plate 49. The plate 49 is pivotally connected to the front wall by means including two pivot buttons 50, 50 interposed between the plate and the front wall, each of the pivot buttons having a generally spherically shaped surface 52 facing the plate 49. Associated with each pivot button 50 is a screw 54 which extends through the front wall 24 and the button, and is threaded into the plate 49 to hold the parts in connected relationship. As shown in FIG. 3, the two pivot buttons 50, 50 are arranged in generally vertical alignment. Pivotal movement of the plate 49 with respect to the front wall 24 is accompanied by a bending of the screws 54, 54 and by a pivotal movement of the plate 49 over the spherical surfaces 52, 52. The two pivot buttons 50, 50 and the two screws 54, 54 therefore serve as a hinge support for the plate to permit the plate to swing about a hinge axis relative to the body 22. Only a slight amount of swinging movement of the plate 49 is required to achieve the objects of the present invention, and therefore only a slight bending of the screws 54, 54 will occur during the adjustment of the plate. Also, it will be seen that the pivotal movement of the plate will occur about a vertical hinge axis passing through the two buttons 50, 50 so that the plate when moved will be swung toward or away from the front wall.

Movement of the plate 49 to different positions of adjustment relative to the front wall 24 is provided by a shaft 56 having a knob 58 on its outer end adapted for manual operation. The shaft 56 loosely passes through the plate 49 and at its inner end is threadably received by the front wall 24 and a plate 60 secured to the front wall. In front of the plate 49 is a collar 62 which is fixedly secured to the shaft 56 and which bears against the plate 49 to limit its outward swinging movement. Received on the shaft 56 between the plate 49 and the front wall 24 is a coil compression spring 64 which acts to bias the plate 49 outwardly and into engagement with the collar 62. From FIG. 2 it will be obvious that turning the knob 58 to thread the shaft 56 into the front wall 24 will tend to move the plate 49 about the pivot buttons 50, 50 in a clockwise sense or toward the front wall, while turning the knob 58 to thread the shaft 56 out of the wall 24 will cause movement of the plate 49 in a counterclockwise sense or away from the front wall.

The spindle 34 is attached to the mounting plate 49 by means of a sleeve 66 which extends through the front wall 24 and the plate 49, and is welded to the latter as at 68. As shown in FIG. 4, the sleeve 66 passes freely through an enlarged opening 70 in the front wall 24 to allow movement of the sleeve relative to the wall. The spindle 34 extends through the sleeve 66 and is journaled thereto for rotation about an axis transverse to the chart sheet by a bearing 67 at the inner end of the sleeve and by a bearing 69 at the outer end of the sleeve. A slot 72 is provided in the sleeve 66 as shown in FIG. 2, and a toothed pulley 74 is fixedly secured to the spindle 34 at the location of the slot 72 for the purpose of driving the spindle as hereinafter described.

The driving mechanism for the spindle 34 is mounted on the plate 49 so as to be movable with the spool as the plate 49 is adjusted relative to the front wall 24. As best shown in FIGS. 2 and 3, this drive mechanism includes an electric motor 76 secured to the mounting plate 49. The motor 76 drives a speed reducing gear mechanism 78 which is directly connected to the housing of the motor 76 and which includes an output shaft 80. The output shaft 80 in turn drives the input member of a shaft mounted clutch 82, which clutch is connected to the housing of the motor 76 by a torque strut 84 to prevent the housing of the clutch 82 from rotating relative to the axis of the shaft 80. The output member of the clutch 82 drives a toothed pulley 86 which in turn drives the toothed pulley 74 on the spindle 42 through a toothed belt 88. The clutch 82 is preferably of the type which is electrically actuated and is operable when energized to provide a driving connection between the output shaft 80 of the motor and the toothed pulley 86, and operable when de-energized to break the driving connection between the latter two parts so that the toothed pulley 86 may rotate independently of the motor shaft 80. Also, the motor 76 is preferably a direct current motor of the type in which the output speed may be varied by varying the voltage supplied thereto.

Referring again to FIG. 1, the chart positioning mechanism 20 also includes a set of controls on the main body 22 for governing the operation of the spindle driving mechanisms. These controls include a speed regulator knob 90, a power switch 92 and a direction switch 94, all located on a control panel 96 attached to the front wall 24. Movement of the power knob 92 from the "off" to the "on" position turns on the fluorescent tube 32 for the purpose of illuminating the chart sheet 36 and also conditions the motors 76, 76 for subsequent operation. Operation of the motors 76, 76 and the clutches 82, 82 is controlled by the direction switch 94. In the "stop" position the switch 94 is effective to de-energize both the motors 76, 76 and to energize both of the clutches 82, 82. This energization of the clutches will tend to prevent rotation of both of the spindles 34, 34 and thereby lock in place the portion 37 of the chart sheet 36 positioned above the exposed face 31 of the plate 30. In this regard it should be noted that the speed reducing mechanisms 78, 78 associated with the motors 76, 76 are preferably of the worm gear type so that torque applied to the output shafts 80, 80 will not rotate the same when the motors are de-energized.

Movement of the direction switch 94 to the "left" position will energize the left-hand motor 76 and the left-hand clutch 82 to cause driving movement of the left-hand spindle 34 in the winding direction, and at the same time will de-energize the right-hand motor 76 and the right-hand clutch 82 to free the right-hand spindle 34 for independent unwinding movement. Thus, the chart 36 is moved toward the left over the exposed face 31 by being unwound from the right-hand spindle 34 and being wound onto the left-hand spindle 34. In a similar fashion movement of the direction switch 94 to the "right" position will energize the right-hand motor and clutch and de-energize the left-hand motor and clutch so that the right-hand spindle will be driven to wind the chart and the left-hand spindle released for independent unwinding movement, thereby causing movement of the chart to the right over the exposed face 31. The speed at which the chart travels over the exposed face 31 is controlled by the switch 92 which regulates the voltage supplied to the motors 76, 76 when the latter are energized by operation of the direction switch 94. Movement of the speed switch toward the "low" position decreases the voltage and thus the speed of the motors, while movement toward the "high" position increases the voltage and the speed of the motors. The electrical connections between the motors, the clutches and the controls form no part of this invention and are conventional and within the knowledge of a person skilled in the art. It is therefore considered to be unnecessary to describe them in more detail.

Turning now to the adjustability of the spindles provided by this invention, it will be apparent from FIG. 1 that as the chart 36 travels to the right or to the left between the spindles 34, 34 it is extremely desirable that it travel in a straight longitudinal path so that the edges thereof will not become crushed or damaged by forcible rubbing contact with the flanges 44, 44 or 46, 46. Also, if the spindles individually include only one or no flange for guiding the chart sheet, a straight longitudinal movement of the sheet is nevertheless desirable so that the chart will retain a fixed transverse position with respect to the exposed face 31 and the reading head 39. It will be obvious from FIG. 1 that any misalignment in the parallel relationship of the two spindles 34, 34 will cause the chart 36 to have a spiral wrapping action with respect to the spindle which is rotated in the winding direction. This wrapping action tends to cause the chart sheet to move axially with respect to the winding spindle so as to run out to one side or another of its intended longitudinal path across the exposed face 31. Likewise, a similar tendency of the chart sheet 36 to run out to one side or the other of its intended path between the spindles 34, 34 may be caused by various irregularities such as warping in the chart sheet 36. By means of the present invention this tendency of the chart sheet to move axially of the two spindles 34, 34, or transversely of the exposed face 31, may be corrected or compensated for by adjusting the angular positions of the spindles 34, 34 to bring the same into the proper relationship relative to each other and to the main body 22. In the illustrated embodiment of the invention the two spindles are located on either side of the upwardly exposed face and are adjustably movable in a plane generally parallel to the face. It is to be understood however that the two spools may be otherwise located relative to the exposed face. Also, the two spindles may be adjustably movable in different planes which need not be parallel to the exposed face, and in some cases it may be desirable to have only one of the two spindles adjustable. The important consideration is that the relative angularity of the two spindle axes be adjustable by adjustment of one or both of the spindles in one or more planes.

The angular adjustment of the two spindles 34, 34 is preferably made when the chart sheet is first positioned in the mechanism 20 and before any data measurements or readings are taken. Assuming that the chart is positioned in the mechanism with opposite end portions of the chart wound respectively on each of the two spindles, the power switch 92 is first turned to the "on" position, and then the direction switch 94 is operated to cause the chart to travel in one direction or the other across the exposed face 31. For example, say the switch 94 is turned to the "right" position to cause winding movement of the right spindle and travel of the chart sheet from the left to the right across the exposed face 31. As the right spindle winds the chart sheet, the operator observes the manner in which the sheet is received by the spindle. If he finds that the sheet tends to move toward the rear of the mechanism and against the rear flange 46 he turns the right-hand knob 58 in the clockwise sense. This swings the mounting plate 49 in such a direction as to cause the rear or free end of the spindle to move away from the adjacent side wall 28, and as a result tends to cause the chart sheet to move away from the rear flange 46. Likewise, if the operator finds that the chart sheet tends to move toward the front of the mechanism and against the front flange 44 he turns the knob 58 in the counterclockwise sense to swing the rear or free end of the spindle 34 toward the adjacent side wall 28. The operator continues the adjustment of the knob 58 until the chart sheet 36 travels freely onto the right spindle 34 without rubbing against either of the flanges 44 or 46.

After the chart sheet is made to wind properly on the right spindle 34, the direction switch 94 is operated to cause winding movement of the left spindle 34 and travel of the chart sheet from the right to the left across the exposed face 31. The operator then observes the manner in which the left spindle receives the sheet and adjusts the left-hand knob in the same manner as previously employed in connection with the right-hand knob to cause the chart sheet to wind properly onto the left-hand spindle without forcibly rubbing against either one of the flanges.

The adjustment process above described is then repeated by driving the chart sheet to the right and readjusting the right-hand knob 58, followed by driving the chart to the left and readjusting the left-hand knob 58. This reversal of the chart travel and readjustment of the knobs 58, 58 is continued until the operator finds that the chart sheet will wind properly onto either one of the spindles 34, 34 without further readjustment of the knobs 58, 58.

The mechanism is then ready for use in reading the chart.

The invention claimed is:

1. A positioning mechanism for use with an elongated chart sheet having data recorded thereon, said mechanism comprising a body having an upwardly exposed face adapted to support a chart sheet as aforesaid for longitudinal movement of such a chart sheet thereover in a desired direction of travel, first and second spindles adapted to respectively carry in wound fashion opposite end portions of a chart sheet as aforesaid, said spindles being rotatable about axes generally transverse to said direction of chart travel and disposed in such positions that when one of said spindles is rotated to unwind such a chart sheet the sheet may pass over said exposed body face and then be wound upon the other of said spindles, a drive mechanism including a motor operable to rotate said first spindle in the direction to wind a chart sheet such as aforesaid and cause said chart sheet to be unwound from said second spindle and moved longitudinally along said upwardly exposed body face, a supporting plate on which said first spindle and said drive mechanism including said motor are mounted and which support plate is pivotally connected with said body for angular movement relative thereto, and adjustment means for varying the angular position of said supporting plate with respect to said body so as to shift the angular position of said first spindle and said drive mechanism with respect to said body and said second spindle.

2. A positioning mechanism for use with an elongated chart strip having data recorded thereon, said mechanism comprising a body having an upwardly exposed face adapted to support a longitudinal portion of a chart sheet such as aforesaid, a first support plate pivotally connected with said body for swinging movement about a first axis, a second support plate pivotally connected with said body for swinging movement about a second axis, means associated with said first plate for angularly adjusting its position relative to said body by moving it about said first axis, means associated with said second plate for adjusting its position relative to said body by moving it about said second axis, a first spindle mounted on said first plate for rotation about an axis fixed with respect to said first plate, a second spindle mounted on said second plate for rotation about an axis fixed with respect to said second plate, and a drive mechanism mounted on at least one of said plates for movement therewith relative to said body and operable to rotate the associated spindle in a given direction, said first and second spindles being adapted to respectively carry in wound fashion the opposite end portions of a chart sheet as aforesaid and being so located with respect to said body that as such a sheet is unwound from one of said spindles it may pass over said exposed face and may then be wound upon the other of said spindles, and said first and second axes about which said first and second plates are movable being so arranged with respect to said body that by adjustment of said plates thereabout the axes of said spindles may be shifted to bring the same into such a relationship as to cause a chart sheet such as aforesaid to travel in a straight path between said first and second spindles as a result of being unwound from one of said spindles and wound on the other of said spindles.

3. A positioning mechanism for use with an elongated chart sheet having data recorded thereon, said mechanism comprising a main body having a flat and generally rectangular upwardly exposed face across which a chart sheet such as aforesaid may be moved for the purpose of displaying the same, two support plates disposed respectively at the two front corners of said body and extending for some distance along the front of said body, means connecting said plates to the front of said body for angular movement with respect to said body about generally vertical axes, adjustment means operable to move said plates to various angular positions with respect to said body and to hold said plates in the positions to which they are moved, two spindles each rotatably carried by a respective one of said plates and extending from said plates toward the rear of said body and respectively along the left and right sides of said body in spaced relationship to said latter sides, said spindles being adapted to respectively carry the opposite end portions of a chart sheet such as aforesaid so that as such a sheet is unwound from one spindle it may travel between the right and left sides of said body and over said exposed face and then be wound upon the other of said spindles, the adjustable movement of said support plates relative to said body serving to angularly shift the axes of said spindles and enabling said spindle axes to be brought into such a relationship as to cause a strip as aforesaid to travel in a straight path between said two spindles as a result of its being unwound from one spindle and wound on the other spindle, and two driving mechanisms for rotating said two spindles, said two driving mechanisms being mounted respectively on said two support plates for movement therewith relative to said body and being drivingly connected with said spindles and alternately operable to cause rotation of one or the other of said spindles in the winding direction.

4. A positioning mechanism for use with an elongated chart sheet having data recorded thereon, said mechanism comprising a main body having a flat and generally rectangular upwardly exposed face across which a chart sheet such as aforesaid may be moved for the purpose of displaying the same, two support plates disposed respectively at the two front corners of said body and extending for some distance along the front of said body, means connecting said plates to the front of said body for angular movement with respect to said body about generally vertical axes, adjustment means operable to move said plates to various angular positions with respect to said body and to hold said plates in the positions to which they are moved, two spindles each rotatably carried by a respective one of said plates and extending from said plates toward the rear of said body and respectively along the left and right sides of said body in spaced relationship to said latter sides, said spindles being adapted to respectively carry the opposite end portions of a chart sheet such as aforesaid so that as such a sheet is unwound from one spindle it may travel between the right and left sides of said body and over said exposed face and then be wound upon the other of said spindles, the adjustable movement of said support plates relative to said body serving to angularly shift the axes of said spindles and enabling said spindle axes to be brought into such a relationship as to cause a strip such as aforesaid to travel in a straight path between said two spindles as a result of its being unwound from one spindle and wound on the other spindle, and two driving mechanisms for rotating said two spindles, said two driving mechanisms being mounted respectively on said two support plates for movement therewith relative to said body and each of said driving mechanisms comprising a motor and a clutch, said clutch is operable to engage and disengage the motor to and from driving relation with the associated spindle.

5. A positioning mechanism for use with an elongated chart sheet having data recorded thereon, said mechanism comprising a body having an upwardly exposed face adapted to support a portion of a chart sheet such as aforesaid, two spindles associated with said body and adapted respectively for the winding and unwinding of such a chart sheet, said spindles being rotatable about transverse axes and being so disposed that a chart sheet upon being unwound from one spindle may pass over said upwardly exposed face of the said body and then may be wounded upon the other of said spindles, means associated with one of said spindles for angularly adjusting its axis with respect to the axis of the other spindle so as to enable said spindles to be brought into such a relationship as to cause a chart sheet such as aforesaid to respectively wind onto and unwind from said spindles and move longitudinally over said body face without any tendency to move axially with respect to either of said spindles when said one spindle is rotated in the winding direction, a drive mechanism including a motor associated with said one spindle for rotating the latter in the winding direction to cause said one spindle to wind a chart sheet such as aforesaid and cause said chart sheet to be moved along said upwardly exposed body face and to be unwound from the other of said spindles, and means supporting said drive mechanism including said motor in fixed relation to the axis of said one spindle so that said drive mechanism including said motor moves with said one spindle relative to said other spindle when said one spindle is adjusted as aforesaid.

6. In a positioning mechanism for use with an elongated chart sheet having data recorded thereon, the combination comprising a body having walls and an upwardly exposed face adapted to support a portion of a chart sheet such as aforesaid, a spindle adapted to carry in wound fashion one end portion of a chart sheet such as aforesaid, and means for supporting said spindle from said body and for permitting angular adjustment of the axis of said spindle relative to said body to cause said chart sheet to wind or unwind onto or from said spindle in a desired manner when said spindle is rotated, said latter means comprising a support plate arranged in generally parallel spaced relationship to one of said walls and on which support plate said spindle is mounted for rotation about an axis fixed relative to said plate, means for hingeably securing said plate to said body so as to permit swinging movement of said plate relative to said one body wall about a hinge axis fixed relative to said body, spring means for biasing one end of said support plate away from said one body wall, a shaft passing loosely through said one end of said support plate and threadably received by said one body wall, and means defining a shoulder on said shaft for engaging said support plate and limiting its movement away from said one end wall with the result that threading said shaft into or out of said one body wall causes said support plate to be moved about its hinge axis against or under the influence of said spring means to change the position of said spindle axis relative to said body.

7. The combination as defined in claim 6 further characterized by said spring means comprising a coil compression spring surrounding said shaft and located between said one body wall and said support plate.

References Cited in the file of this patent
UNITED STATES PATENTS

| | | |
|---|---|---|
| 1,114,494 | Little | Oct. 20, 1914 |
| 1,841,562 | Warren | Jan. 19, 1932 |
| 2,328,055 | Clough | Aug. 31, 1943 |